(12) United States Patent
McNab et al.

(10) Patent No.: US 7,840,428 B2
(45) Date of Patent: Nov. 23, 2010

(54) METHOD, SYSTEM AND APPARATUS FOR MEASURING AND ANALYZING CUSTOMER BUSINESS VOLUME

(76) Inventors: David Boyd McNab, 36 Darby Way, Thornhill, Ontario (CA) L3T 5V1; Hugh E. T. Oddie, 134 Wells St., Toronto, Ontario (CA) M5R 1P4

(*) Notice: Subject to any disclaimer, the term of this patent is extended or adjusted under 35 U.S.C. 154(b) by 1754 days.

(21) Appl. No.: 10/413,299

(22) Filed: Apr. 15, 2003

(65) Prior Publication Data

US 2003/0208468 A1 Nov. 6, 2003

(51) Int. Cl.
*G06Q 90/00* (2006.01)
(52) U.S. Cl. ............................................. 705/7; 705/10
(58) Field of Classification Search ................ 705/7, 705/10
See application file for complete search history.

(56) References Cited

U.S. PATENT DOCUMENTS

| | | | |
|---|---|---|---|
| 6,026,382 A * | 2/2000 | Kalthoff | 705/35 |
| 7,319,996 B2 * | 1/2008 | Chen et al. | 707/3 |
| 2003/0135382 A1 * | 7/2003 | Marejka et al. | 705/1 |

OTHER PUBLICATIONS

Miguel A.P.M. Lejeune, "Measuring the Impact of Data Mining on Churn Management," Internet Research: Electronic Networking Applications and Policy 11:5 (2001) pp. 375-387.*
Michael J. Shaw, "Knowledge Management and Data Mining for Marketing," Decision Support Systems 31 (2001) pp. 127-137.*

* cited by examiner

*Primary Examiner*—Beth V Boswell
*Assistant Examiner*—Neil R Kardos

(57) ABSTRACT

A method, system and computer product for analyzing and monitoring business volume is provided. A database is linked with a database management utility. Business data is loaded on the database. The business data include data related to accounts, hierarchical account/product relationships, and hierarchical account/customer relationships. The database support relational data queries to the business data. A plurality of threshold changes is defined regarding the business data, and is associated with the database A plurality of threshold tests for detecting changes throughout a selected set of the business data is performed in accordance with the threshold change values. The results of the tests are combined to obtain a classification of data that produces business volume data. The business volume data permits the analysis and monitoring of flows of business into, out of and among account, customer and products groups of a business. The business volume data also provide customer behaviour data.

20 Claims, 3 Drawing Sheets

METHOD, SYSTEM AND APPARATUS FOR MEASURING AND ANALYZING CUSTOMER BUSINESS VOLUME

FIELD OF THE INVENTION

This invention relates in general to systems, computer products and methods for measuring and analyzing customer business volume. This invention more particularly relates to measurement and analysis of customer business volume as a basis for business decision making, planning, performance evaluation, customer behaviour modeling and creating strategies and marketing interventions to acquire, extend or retain customer business relationships.

BACKGROUND OF THE INVENTION

Numerous systems and related databases for monitoring business performance are known. Methods are also known for analyzing such business performance data having regard to a number of criteria, including for the purpose of data modeling and deriving market strategy data.

Business performance could be measured in terms of a number of such indicia such as sales, market share within a defined market segment, sales increase per dollar spent on items such as marketing, and a broad range of financial performance data, etc.

One of the challenges in providing such systems and related databases, and implementing such methods, is that monitoring of performance of a business may preferably include analysis of relevant data of different types, and further segmentation within such different types of business performance related data. Another challenge in providing such systems and related databases, and implementing such methods, is that businesses are often organized into a number groups for the purpose of business performance, and it may be preferable to measure business performance in accordance with one or more of such groups apart from the rest of the business. Another challenge is that it is often difficult to obtain a holistic or enterprise view of customer behaviour.

For example, to illustrate the organization of businesses into a plurality of groups, many businesses in the financial services, retail and telecommunications areas are organized into separate business units differentiated by geographical area, product line and increasingly, by customer segment. Each separate business unit constitutes a distinct profit center, whereby it is desirable to permit variable compensation from profit center to profit center by measuring each profit center's business performance.

A financial services company provides a useful example. The financial services company offers a wide range of products and services to the retail (individuals) market. Presume that they have only two customers, "A" and "B" and that each has holdings of products or services in two time periods "0" and "1' as follows:

| Product | Customer A Period 0 (t0) Balance | Customer A Period 1 (t1) Balance | Customer B Period 0 (t0) Balance | Customer B Period 1 (t1) Balance |
|---|---|---|---|---|
| Demand Deposit | 100 | 50 | 500 | 600 |
| Term Deposit | 2000 | 3050 | 4000 | 4000 |
| Money Market Mutual Fund | 3000 | 2000 | 3000 | 4000 |
| Total | 5100 | 5100 | 7500 | 8600 |

In this example, Customer "A" has transferred monies from Demand Deposit and Money Market accounts to fund an increase in Term Deposit balance. Customer "B" has invested an additional 100 in Demand Deposit and 1000 in Money Market accounts.

We will use this example to illustrate the prior art methods that are commonly used to measure business performance, and the disadvantages of such prior art methods, as well as system and computer products that implement such prior art methods. The financial services business is illustrative of the disadvantages of the prior art because financial services businesses generally offer a plurality of "products" in more than one location at any given time. It should be understood that the indicia described below in relation to the prior art methods described below under the headings "Account Level Meaurement", "Product Portfolio Measurement", and "Customer Level Measurement" have particular relevance to the example of a financial services business. Such indicia, however, will generally have equivalents in the context of other businesses. For example, product measurement, product line measurement and unit measurement e.g. in retail, Baked beans with no additions, all Beans, one supermarket's Bean sales.

Account Level Measurement

Businesses, including financial services business, will generally engage in "Account Level Measurement" which involves comparing business volume metrics (transaction volume, transaction value, balance value, etc.) at two points in time and calculating the difference between them as a metric of change. This is a commonly used practice, in the public domain, that is quite sufficient for mono-line (single product) businesses and businesses where product substitution is not common behaviour. Identification of changes in business volume in such businesses can be identified by identifying change in business volume (if any) between two given points in time.

Using account level metrics, the following observations will be noted for our illustrative example:

| Product | Customer A Change t0 – t1 | Customer B Change t0 – t1 |
|---|---|---|
| Demand Deposit | −50 | +100 |
| Term Deposit | +1050 | Nil |
| Money Market Mut. Fund | −1000 | +1000 |

Interpretation of this data for each product respectively, as outlined herein, indicates the following:

1. Demand deposit accounts had an outflow of 50 and an inflow of 100
2. Term deposit accounts had an outflow of nil and inflow of 1050
3. Money market funds had an outflow of 1000 and an inflow of 1000.

Yet we know from the example that this overstates the activity of Customer "A" that merely transferred money between accounts. Therefore, one disadvantage of the known method of measuring business performance in accordance with "Account Level Measurement" is that the data provided as a result of such method does not permit distinction between transfers ("internal") and third party ("external") money flows.

"Account Level Measurement" may in some circumstances be deficient as a basis for determining changes in business volume when one product or service can be used by the customer as a substitute for another. In this circumstance, measurement of business volume change at the account level does not necessarily imply a change in business volume at the customer level because one account's volume may decrease due to the substituted use of another product or service. Product substitution may not be easily separated in accordance with prior art "Account Level Measurement" methods from business volume changes associated with business acquired or lost.

In view of the above, "Account Level Measurement" as a basis for monitoring and analyzing business performance may result in a number of disadvantages.

First, the measurement of real business volume changes will be inflated by failing to recognize and eliminate the effects of internal transfers between accounts and products.

A second potential disadvantage of "Account Level Measurement" is that business performance measurements in accordance with this method may indicate success and failure inappropriately, as in the example above where demand deposits "gained" 100, term deposits "gained" 1050 and money market "gained" 1000. Similarly demand deposits "lost" 50, term deposits "lost" nil and money market "lost" 1000. In reality, all of the effects of Customer "A"'s business activity should preferably be removed from the business performance measurement criteria as it was made up entirely of internal transfers.

A third potential disadvantage of "Account Level Measurement" of business performance is that reliance on this method of measurement may result in distortion of compensation of sales personnel based on sales performance. It is a common practice for companies to pay sales forces for acquisition of new business. Reliance on account level metrics results in overcompensation of sales personnel due to the failure to eliminate the effects of internal transfers in the determination of acquisition volume, as outlined above.

A fourth disadvantage of "Account Level Measurement" may result when a business relies on information of this type as input to behavioral models or marketing strategy or actions. False leads are indicated where it appears that a customer is adding or removing business volume when in fact it is simply being transferred internally.

Product Level Measurement

Businesses, including financial services business, will generally also engage in the known method of "Product Level Measurement" or "Product Portfolio Measurement" for monitoring business performance. Specifically "Product Level Measurement" tracking of changes in business volume has been developed as an alternative to "Account Level Measurement" in businesses where product substitution effects are pervasive. "Product Level Measurement" involves comparing business volume metrics (transaction volume, transaction value, balance value, etc.) at two points in time, after aggregation of related accounts based on a cross-reference index that defines an account to product or product group relationship, and calculating the difference between them as a metric of change, as illustrated below. This is a commonly used practice, in the public domain.

Provided below, for purposes of illustration, based on the parameters already provided in the first example above, is a simple example of application of "Product Level Measurement" in the context of a financial services business:

| Product | Product Change t0 – t1 |
|---|---|
| Demand Deposit | +50 |
| Term Deposit | +1050 |
| Money Market Mut. Fund | Nil |

Interpretation of this data provides the following information:
1. Demand deposit accounts had an inflow of 50
2. Term deposit accounts had an inflow of 1050
3. Money market funds had no change.

Yet we recall that Customer "A" has transferred monies from Demand Deposit and Money Market accounts to fund an increase in Term Deposit balance, and Customer "B" has invested an additional 100 in Demand Deposit and 1000 in Money Market accounts.

"Product Level Measurement" may be disadvantageous as a means for monitoring business performance in that it requires aggregation of individual account level data prior to determining whether a change has occurred at the product level. As a direct result of the aggregation process, individual account, customer and customer group behaviour is obscured from the analysis of business volume change.

A consequence of this aforesaid disadvantage may be that changes observed in a product level metric do not "explain" changes that are observed at the customer or customer group level, due to the offsetting effects of changes in individual customers' accounts. In addition, when product or service substitution occurs that crosses between products or product groups at a level of aggregation higher than that chosen for the analysis, the transfer will be interpreted as an external flow instead of a transfer.

For the reasons stated, "Product Level Measurement" may result in a number of other related disadvantages in monitoring business performance.

First, business performance measurements may indicate success and failure inappropriately, as in the example above where demand deposits "gained" 50, term deposits "gained" 1050 and money market was neutral. In reality, all of the effects of Customer "A"'s business activity should be removed from the performance measurement criteria.

A second potential disadvantage in basing business performance monitoring on "Product Level Measurement" occurs when sales compensation plans are based on metrics of this type. As stated earlier, it is a common practice for companies to pay sales forces for acquisition of new business. Placing reliance on product level metrics may result in inappropriate compensation of sales personnel due to the failure to eliminate the effects of internal transfers between products in the determination of acquisition volume.

Customer Level Measurement

Businesses, including financial services businesses, may engage in yet another known method for business performance monitoring, namely "Customer Level Measurement". This method has been developed as an alternative to account level metrics in companies where product substitution effects are pervasive. "Customer Level Measurement" of changes in business volume involves comparing business volume metrics (transaction volume, transaction value, balance value, etc.) at two points in time, after aggregation of related accounts based on a cross-reference index that defines an account to customer relationship, and calculating the difference between them as a metric of change. This method is illustrated by the example provided below.

Provided below, for purposes of illustration, based on the parameters already provided in the first example above, is a simple example of application of "Customer Level Measurement" in the context of a financial services business:

| Customer "A" Change<br>t0 – t1 | Customer "B" Change<br>t0 – t1 |
|---|---|
| Nil | 1100 |

Interpretation of this data provides the following information:
1. Customer "A" exhibited no change
2. Customer "B" added 1100 in business volume Recall that Customer "A" has transferred monies from Demand Deposit and Money Market accounts to fund an increase in Term Deposit balance, and Customer "B" has invested an additional 100 in Demand Deposit and 1000 in Money Market accounts.

"Customer Level Measurement" may be disadvantageous as a means for monitoring business performance in that it requires aggregation of individual account level data prior to determining whether a change has occurred at the customer level. As a direct result of the aggregation process, individual account, product and product group behaviour is obscured from the analysis of business volume change.

A consequence of this aforesaid disadvantage may be that measurement at the customer level provides no insight into which accounts, products or product groups underlying the observed customer level change are affected, limiting the usefulness of the information for the purposes of portfolio analysis, performance planning and evaluation, compensation of identification of specific marketing strategies or actions.

The aforesaid disadvantage is best illustrated with another example. Consider the marketing manager's situation. They know that Customer "A" has not changed their position in the period and Customer "B" has added 1100 to their position. The marketing manager or his/her staff must decide what appropriate communications to direct to each of these customers.

Customer "A" appears to have done nothing, according to the measurement provided by the prior art. In fact, they have changed product use substantially, shifting monies from money market mutual funds and demand deposits into term deposits. This change has several interesting features, none of which are revealed to the marketing manager by the prior art.

First, the customer has not been dormant, they have made an investment decision of some significance. This may indicate a lifestyle change, needs change or change in expectations about future financial needs. Any of these changes may warrant a dialogue between financial services business and its customer.

Second, in the context of the financial services business example, the customer has shifted away from short term (liquid) assets to a longer term asset category (term deposit). This change suggests that the customer's relationship is less at risk of defection than it previously was, as there is a high correlation between liquidity and customer defection. It should be understood that in other business environments, depending on business specific or industry specific factors, similarly relevant data may be read from such business flows.

Third, due to the reduction in liquidity of the customer's position, there may be an opportunity to sell him/her additional products or services to meet short-term financial obligations that may arise, such as for example a credit card or line of credit.

An appropriate response to customer A's behaviour would be a dialogue concerning investment preference, changes in their financial prospects and potential relevance of short term lending products to provide liquidity. The prior art indicated no insight into this dialogue, because the pertinent insights were lost in the aggregation of the customer's product holdings prior to performing the analysis of change in customer position.

Customer "B" in accordance with the example provided has added monies to their accounts. The prior art methods may not detect this increase in position, and may fail to indicate which products increased or whether the accounts were newly opened or augmented. The marketer knows a "thank you" letter is an appropriate response, but the prior art methods may fail to provide the context for such a communication such as what the customer bought.

Financial services business provide a classic example of the downstream effects of the aforementioned "gaps" in business performance data provided by the prior art methods described. Deposit taking business units within financial services businesses suffered substantial decline in business volume throughout the 1990s while mutual funds business grew at a rate well in excess of market growth. Managers of these institutions have in many cases been unable to determine how much of the growth in mutual funds was a result of third party sales and how much was attributable to internal transfers of business. Similarly, managers have not been able to identify how much of the decline in term deposits resulted from transfers to mutual funds (due to changing investor preference) and how much of the business was lost to third parties. Knowing this information is critical to performance management and strategic management of a financial services business.

Similar problems are found wherever product substitutes are available from a business, including for example in the areas of retail sales or telecommunications industries. For example, when introducing a new product into an existing line of similar products in the retail sales industry it is often difficult to establish how much of the new product's sales volume is the result of cannibalization or substitution versus new sales for the product line when considered as a whole.

A different performance management problem arises when a company institutes more than one of the prior art methods at the same time. Because there are offsetting effects within a customer's total position that cancel each other out when a customer transfers business among products or services (some go up some go down), the measurement of business performance at the customer level may not agree with the results, based on the same data, calculated at the product or account levels. This situation arises often and results in confusion and uncertainty among the decision-makers of the business as to which information is correct. The prior art methods do not generally permit the manager to reconcile between the different views of business performance provided by the prior art methods described, i.e. such prior art methods may not provide an overall snapshot of business performance relative to account, product and customer levels simultaneously.

In addition to performance management at an executive and strategic level, sales commissions are also frequently paid to sales persons and agents for bringing new business into a company, as mentioned above. This is a common practice in financial services businesses (excluding brokerage divisions), telecommunications and retail sales businesses. Without the ability to differentiate between "old money" transferring from one product to another and "new money" transferring into the company from external sources, there is a substantial risk of overpayment of commissions. Particularly in areas of business where sales commissions represent a relatively significant cost of business, the resultant overpayment may also be commensurately significant.

It is also well known that this phenomenon is exacerbated by sales persons who may take advantage of the technical aspects of their performance measurement systems in order to maximize their commission earnings. For example, a shrewd sales person may direct a customer to move money into first one product then another and so forth in order to generate a commissioned payment on each transaction executed, to the detriment of the company. The prior art methods do not provide for differentiation of "new" and "old" money, which is fundamental to internal control of commission payments.

Furthermore, the prior art methods generally do not provide key information that is useful in time series analysis of customer behaviour. At the level of the individual customer it is pertinent to be aware of changes in their business activity levels and preferences. Many businesses expend significant resources on acquiring and implementing data mining and business intelligence capabilities, and also on developing predictive models of customer behaviour. Examples of specific customer behaviour of interest includes the propensity of a customer to buy a product based on affinity group, propensity to abandon or defect from a product, propensity to default on a credit instrument and the like. The prior art does include a number of models of this nature, which derive their predictive capability through multivariate linear regression or other mathematical techniques, usually using psychographic, demographic and transactional data as independent variables in the analysis. However, the prior art may not include predictive modeling of customer behaviour based on identified and classified flows of customer business into, out of and among products and services, since the prior art does not enable these actual customer behaviours to be defined, classified and measured on a reliable basis.

The prior art may also generally fail to identify qualified opportunities for specific marketing actions and interventions with customers. It is useful to identify candidates for retention activity based on knowledge that a specific customer is in the process of defection of their business relationship. This proposition is supported by a study conducted by McKinsey & Co. ("Customer retention is not enough", The McKinsey Quarterly, 2002, Number 2), which indicates that customers engage in a process of defection that takes a considerable period of time. Most of the cost to a business arising from lost business arises through the process of partial defection (removing part of a customer's business) rather than total defection (removal of all of a customer's business). McKinsey cites examples showing the value loss from partial defection in retail banking at 8 times the value of total defection and 7 times in the airline industry. During the process of defection, earlier intervention has much greater chance of success than later intervention. Accordingly, it is highly valuable to identify customers who exhibit defection behaviour as early as possible. The prior art does not identify defection behaviour separate from internal transfers, except when measuring at the total customer position level. Separating out true defection behaviour is imperative to intervention actions to reduce the volume of contact effort and avoid interactions with customers who appear to be defecting but are actually just transferring their business among products or services.

To summarize, the prior art relating to measuring business flows in these industries falls into three categories (a) account level measurement of changes in business volume (b) product level measurement of changes in business volume and (c) customer level measurement of changes in business volume.

In accordance with the examples provided above, the known methods of "Account Level Measurement", "Product Level Measurement" and "Customer Level Measurement" may not provide adequate means for monitoring business performances, and particularly as a means for producing business performance data that is sufficient for meaningful business performance analysis, or for appropriate response to a business gain or business loss.

Therefore there is a need for a method, system and computer product for monitoring business performance that permits reconciliation of business performance data at the account, customer and product levels.

Specifically, in regard to the desired system and computer product for monitoring business performance that permits reconciliation of business performance data at the account, customer and product levels, it is desirable that such system and computer product be integrated with the information systems of a business in order to provide such business performance data on an efficient and reliable basis.

Systems are known which are capable of providing multiple hierarchies of data and supporting data queries across a selected plurality of data hierarchies, including throughout selected hierarchy levels within such plurality of data hierarchies.

For example, U.S. Pat. No. 6,026,382 issued to Kalthoff on Feb. 15, 2000 discloses a financial system comprising a computer for storing a database describing operations of a financial institution. Significantly, the financial system also comprises a database management system, performed by the computer, which accesses the database stored in the computer via relationships between the different data structures related to the operations of a financial institution, namely party data, product data, account data, internal organization data, contact/transaction event data, location data, campaign data, and channel data.

As another example, U.S. Pat. No. 5,819,251 issued to Kremer et al. on Oct. 6, 1998, discloses a system and apparatus, which stores, retrieves and analyzes relational and non-relational data. An application program provides a data query statement containing both relational and non-relational portions to a relational server. In an embodiment, the query statement is a Structured Query Language ("SQL") CONTAINS stored procedure or CONTAINS function statement. The relational data server then provides the non-relational query to either a text queue or database management language ("DML") queue. A non-relational data server then accesses either the text queue or the DML queue. The non-relational data server obtains pointers to the non-relational data and stores them in a temporary table. The pointers and relational data portion are processed by the relational server to obtain the relational and non-relational data. In an embodiment, the non-relational data server is a text server including an engine, filter, lexer, data storage and word list.

SUMMARY OF THE INVENTION

In a first aspect of the present invention, a method of analyzing and measuring business volume in operation of a database and of a database management utility linked to the database is provided, the method comprising the steps of: Providing to the database business data, including data related to accounts, hierarchical account/product relationships, and hierarchical account/customer relationships, said business data being organized in the database, said database and database management utility supporting relational data queries to said business data; Defining threshold change values regarding said business data, and associating said threshold change values to the database; Performing a plurality of threshold tests for detecting changes throughout a selected set of said business data in accordance with said threshold change values within a specified period of time; and Combining the results of the threshold tests to obtain a classification of data that produces business volume data.

In a second aspect of the present invention a system for analyzing and measuring business volume is provided whereby said business volume data includes data relating data flows into, out of, and among account, product or customer classifications, within a business.

In a third aspect of the present invention a computer product for analyzing and measuring business volume is provided whereby said business volume data provides customer behaviour data.

BRIEF DESCRIPTION OF THE DRAWINGS

A detailed description of the preferred embodiment(s) is(are) provided herein below by way of example only and with reference to the following drawings, in which.

Figure 1:
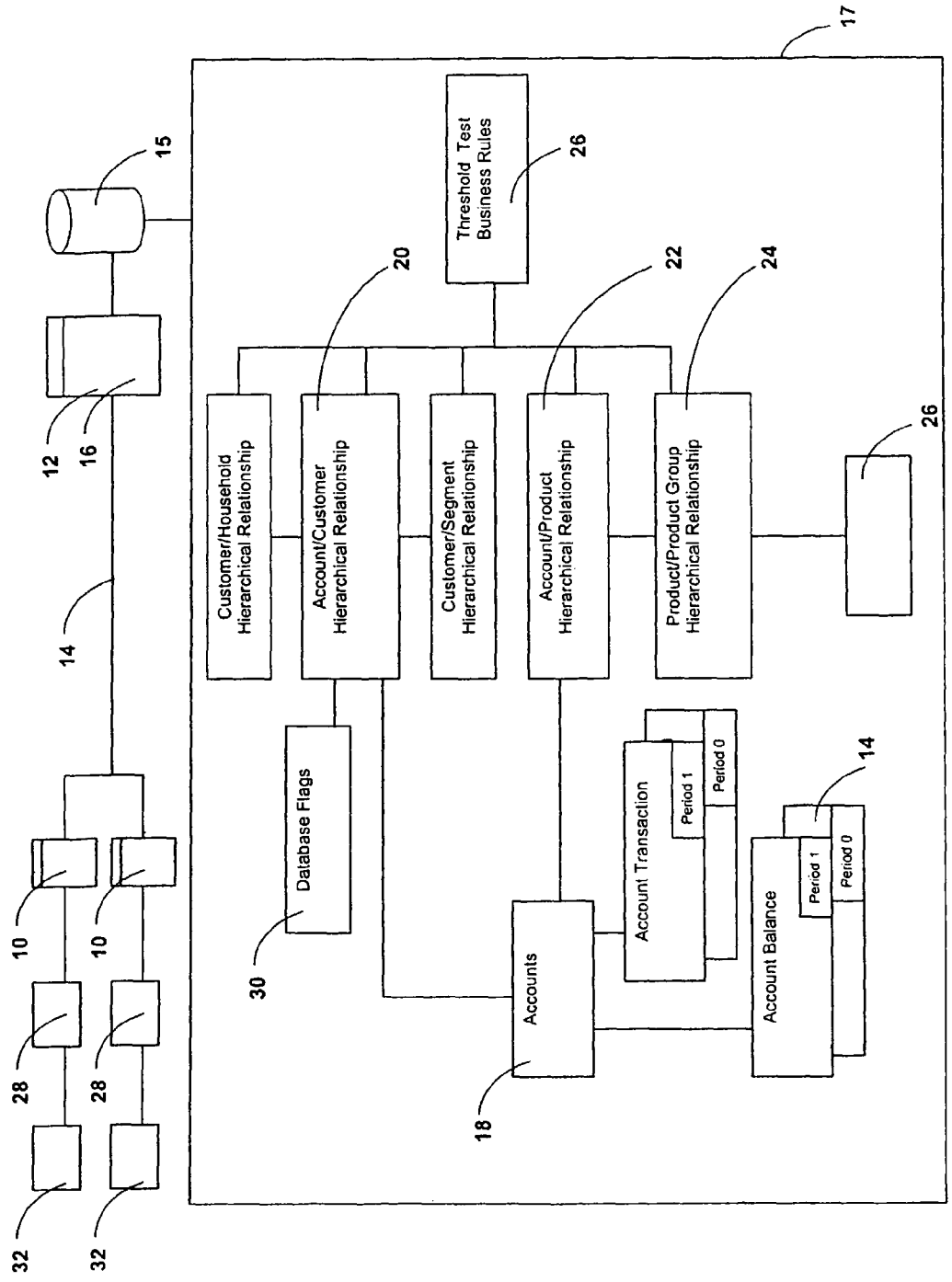
FIG. 1 is a system resource flowchart illustrating the resources of the systems of the present invention in accordance with the preferred embodiment of the present invention.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

The preferred embodiment of the present invention comprises a known client-server computer system adapted to receive and process business related data and store such data in accordance with predetermined criteria in a relational database. The computer product of the present invention is best understood as a database management tool capable of implementing the method of the present invention in association with such client-server computer system, in the manner described below.

As best shown in FIG. 1, the system of the present invention preferably comprises a computer system consisting of at least one commercially available client computer 10 connected to a commercially available server computer 12 by a network 14. Network 14 further connects the server computer to database 15, or data warehouse or data mart.

The relational database referred to, in the preferred embodiment of the present invention, is integrated with the system of the present invention. As best shown in FIG. 1, the relational database comprises a known relational database management system 16 such as are commercially available from IBM Corporation (DB2™), NCR Corporation (Teradata™), Oracle Corporation (Oracle 9iDB™), Microsoft Corporation (Access™) and others. Relational database management system 16 is operably connected to database 15 to provide relational database management as described below.

Database 15 is provided, in a manner that is known, in the form of a plurality of data structures that support the definition of associations among elements of data. Databases having such a data model and comprising such data structures are available from a number of vendors. One such database is described in U.S. Pat. No. 6,026,382, included in the "Background of the Invention" of this disclosure. Similar database models are available commercially from different vendors (Siebel Systems Inc., IBM Corporation, Oracle Corporation, Unisys Corporation and others).

Physical implementation of the database 15 requires the definition of entities and relationships inherent in the data, definition of data elements and therefore will generally involve construction of data tables containing rows of data logically linked through the relational database management system 16, in a manner that is known.

Other implementations of the present invention contemplated. For example, in the absence of the relational database management system 16, it is possible to perform the method of this invention using other forms of data storage such as sequential indexed files (VSAM), but this is a relatively more difficult implementation of a database structure adapted to permit the data queries described in this invention from a coding and file handling perspective. It should be understood, however, that the present invention contemplates system and database implementation supporting data queries in accordance with the described method of the invention.

Business Data

The present invention contemplates that data relevant to performance of a business, and relationships between data described below, will be provided to the database 15 on a regular basis. Data meeting this description is referred to in this disclosure collectively as business performance data 17. If the particular data processes of a business do not permit these data relationships to be established within database 15 on an automated or semi-automated basis (for example in the absence of a relational database), then it should be understood that the present invention contemplates extraction of data from other systems, and organization of such data within the database 15 in a manner that permits such data relationships to be established.

A. Accounts

Database 15 is provided with, in a manner that is known, individual account or contract level data 18 (as best shown in FIG. 1) concerning balances outstanding, purchase behaviour or transaction activity volumes and values or balances (of products or account balances) outstanding, purchase behaviour or transaction activity volumes and values spanning two or more discrete time periods. Account and transaction data relating to an individual account preferably shares a unique and common cross-reference indicator in order to support the data queries described below.

To illustrate the application of preferred cross-referencing in different industries, the following examples are provided. In the financial services industry, for example, a specific financial account or contract and (e.g. deposit or withdrawal) transactions pertaining to it must share a common and unique identification number. In the telecommunications industry, an account and the usage transactions (duration of call, destination etc.) pertaining to it must share a common and unique identification number. In the retail industry, an account must be uniquely identified to the (e.g. purchase and return) transactions pertaining to the account.

The data and its relationships are preferably stored to the database 15 on a period by period basis. In most businesses, this will generally involve the extraction or export, transformation and loading of data from external data record systems to the database 15 of the present invention. Processing in accordance with the method of the present invention is dependent on the cycle time of data refreshment of the database 15 from said source systems. Processing cycles are discussed separately in a separate section.

B. Account-Customer Relationship

Database 15 is provided with, in a manner that is known, a defined relationship between individual accounts (contracts) and individual customers 20 as found in a Customer Information File (CIF) or cross-reference table or index. An account may be associated with one or more customers, for example when jointly owned. Each customer is preferably represented as a unique instance in the CIF with multiple associations to account records.

For illustration purposes, many financial services businesses, retail businesses and telecommunications businesses have already successfully implemented a CIF for customer recognition, billing or service purposes. Preferably the CIF includes all accounts and all customers, and defines the relationships between them. In practice, it is common for a CIF to include a subset of product or service accounts or customers due to practical implementation problems such as delays in setting up new customer records or accounts that are not identified to customers due to administrative error or omission. However, it is also common to encounter multiple databases within a particular business that have not integrated their individual CIF systems into a single unitary system. In these instances, the method is generally most readily applicable to the limited subsets of information which support the requirement of identifying each account to a customer, unless the data from such CIF systems is extracted and transformed, in a manner that is known, to provide same to the database 18 of the present invention, as mentioned above.

C. Account-Product Hierarchical Relationship

Database 15 is also provided with, in a manner that is known, a defined relationship between accounts (contracts) and products or services 22, wherein a product or services is defined as an aggregation of accounts having similar attributes. It is a common practice for businesses to identify accounts with similar attributes to groups identified as a product or service.

For example, in retail packaged goods sales, a number of similar goods with similar characteristics may be considered to be a single product e.g. all of the bottles of a specific brand of shampoo of the same size and manufacture are considered to be one product. Similarly in financial services businesses all accounts with identical attributes with the same or different beneficially owning customers are considered to be one product. In telecommunications, each individual customer's residential landline account will be an account within the product residential landline service classification.

Definition of products or services in this manner is generally required for all accounts in practicing the method disclosed herein. Such definition exists in most businesses as a means to simplify business management or statutory reporting. In the absence of this definition, it is necessary to create the account-product relationship within the relational database management system 16.

D. Product-Product Group Hierarchical Relationship

Database 15 is further provided with, in a manner that is known, a defined relationship between products or services and product groups or service groups 24, wherein a product group or service group is defined as an aggregation of similar products or services that can logically be treated as substitutes or alternatives. Defining the relationship of products or services to product groups or service groups 24 preferably involves assessment of customers' product substitution behaviours.

In a business that has only one product (e.g. mono-line credit card issuer), or where substitution is not a logical behaviour (e.g. substitution of shampoo for a telephone connection), product groups cannot be created that meet the requirement criteria as described herein. The existence of product groups is imperative to realizing value from the invention, as it is possible and appropriate in mono-line businesses or businesses that do not experience substitution effects to measure customer business velocity changes at the consolidated customer level.

In accordance with the present invention, at least one level of product group relationship 24 is preferably defined. For example, this may comprise a level definition of a product group with largely similar attributes that can logically be used by the consumer as substitutes. Determining logical substitutions is established by professional judgment, for example, of a marketing director familiar with the particular business in relation to which this invention is implemented.

If the knowledge is not sufficient within the business to define first order product groups (i.e. logical product substitutes), this information can be obtained directly by interviewing consumers or employing external industry experts with the requisite knowledge and experience to identify first order product groups.

An example of product to product group relationship 24 at the first level drawn from the retail packaged goods sales industry would be "20 oz. size shampoo" as a product group made up of different brands and manufacturer's individual 20 oz. size shampoo products. This product group meets the requirement of having all member products having similar attributes (20 oz.) and logically substitute usage (washing hair).

Similarly in the financial services industry, interest bearing checking products and non-interest bearing checking products may together comprise the product group "checking accounts". While the individual product features differ in some respects (interest or no interest), the core or defining attributes of the products (ability to write checks, on-demand access to funds) are similar and their use identifies these products as substitutes.

In the telecommunications industry residential phones as a product group may include the products primary line, secondary line and tertiary line.

E. Additional Hierarchical Levels of Product and Customer Groups

Additional levels of product group hierarchy (e.g. higher-order groupings or special groupings such as total assets, liquid assets or any other special purpose grouping) or customer hierarchy (e.g. higher-order groupings such as household, family, affiliation, customer segment, holding company, related company or any other special purpose grouping) can be incorporated into the database 15 and thereby used in practice of the method of the present invention. It should be understood that such additional data hierarchies are not a requirement of the present invention but merely serve to enrich the interpretive value of the information created by the method and system. This is illustrated by the example drawn from the financial services industry shown in FIG. 2.

F. Business Rules

Business rules 26 applicable to a particular business wherein the present invention is implemented define the parameters for the application of the method, as described below. These business rules 28 are collected and expressed, and then implemented in the system of the present invention in a manner that is well known.

More specifically, business rules 26 may provide threshold change values results (Yes or No) when the business logic of the present invention is applied, in relation to the data and data relationships identified above.

Business rules 26, in the preferred embodiment of the present invention, are defined for each combination of product, product group and customer segment. If customer segments are not defined as in (E) above, all customers are treated as belonging to a single segment.

Each individual business rule 26 provides the parameter values to be tested in comparison to the change in values between time periods calculated in accordance with the business logic of the present invention. The business rule 26 will generally in relation to a particular business include parameters values for (a) absolute value change, (b) percent value change, (c) transaction count change, (d) percent transaction count change, (e) transaction value change and (f) percent transaction value change.

Figure 2:
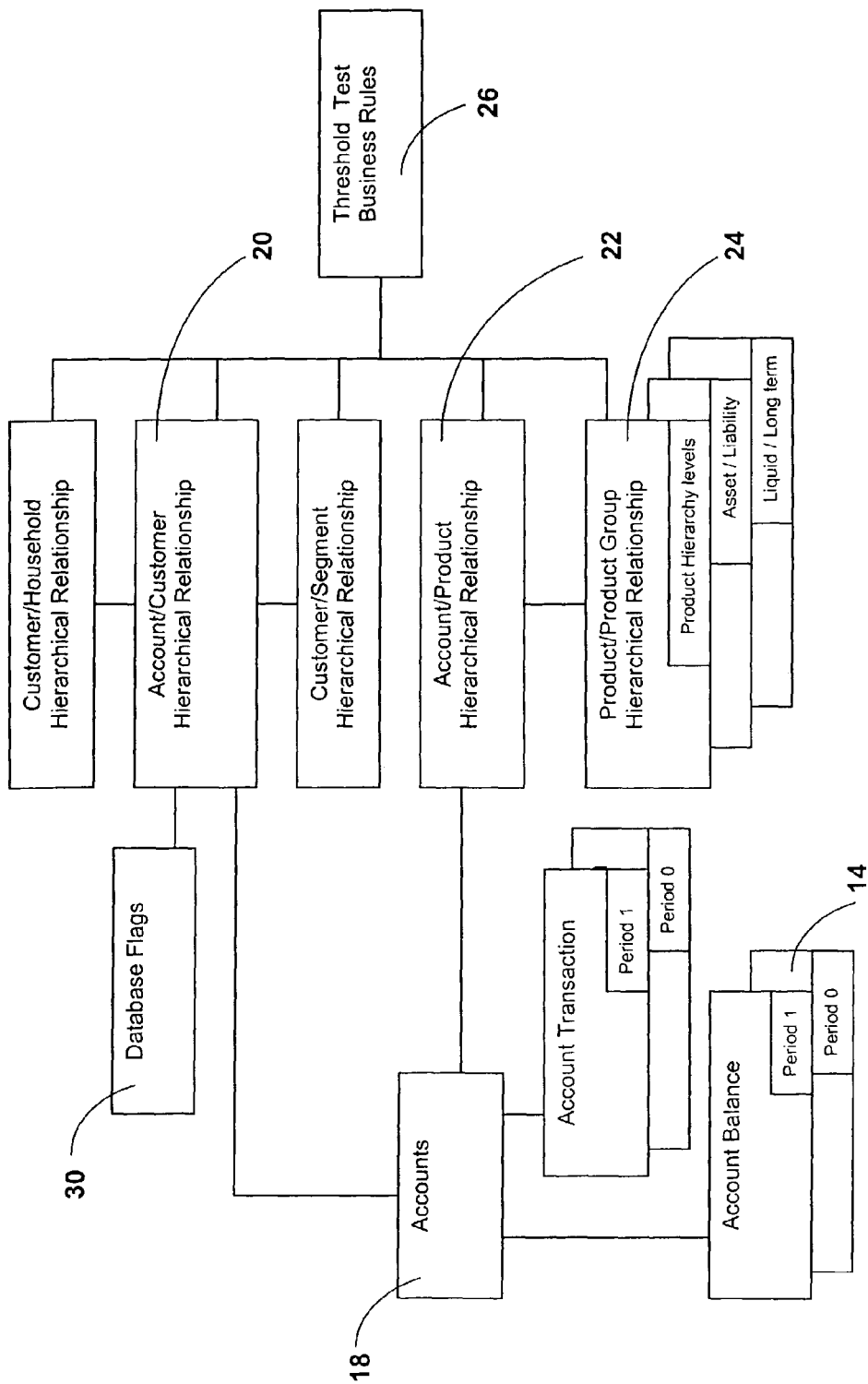
FIG. 2 is a system resource flowchart illustrating the resources of the system of the present invention in accordance with a preferred embodiment of the present invention, implemented in the context of a financial services business for the purpose of illustration.
Figure 3:
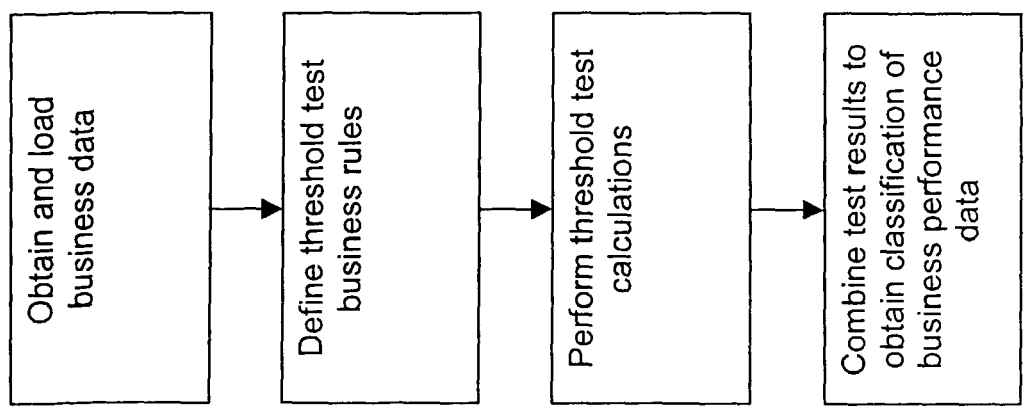
FIG. 3 is a flowchart illustrating the method of the present invention.

In the example of a financial services business, two additional parameters are defined for (i) testing the change in the ratio of assets to liabilities and (ii) testing the change in the ratio of liquid to non-liquid assets, as illustrated in FIG. 2.

The value of the parameters defined by the business rules 26 is determined by a person with ordinary skill in the art of analyzing the business performance of the particular business wherein the present invention is implemented. This is achieved by analysis of the subject population of accounts. The objective when setting the parameter values is to define changes in business volume that are significant in the context of the relationship of the business to the individual customer or the enterprise as a whole.

Two alternative methods for defining such business rule 26 are provided for the purpose of illustration.

The first method involves observing account and transaction data between two periods of time and preparing an analysis of the changes in that data for each combination of product, product group and customer segment. Stratification of the change observations into percentiles is a preferred method of performing this analysis. The significance of the changes (and the corresponding level at which the threshold parameter is specified) is identified by applying the decision criterion "only 15% of changes are considered significant" to the population behaviour or a similar statistically significant percentage. Determination of the appropriate value of the decision criterion is ultimately determined by professional judgement.

The alternative method of providing the values of such business rules 26 provided for illustration purposes is more complex. For each individual customer, the historical values of changes in business volume can be analyzed in time series if sufficient data exists to permit such analysis. This method, often called longitudinal analysis can be used to mathematically determine specific parameters unique to every customer in the population, based on their individual historical behaviour patterns. This technique is presently in use in a number of commercially available analysis methods that strive to identify significant changes in customer behaviour from parametric analysis of individual transactions. NCR Corporation's CRM Solution (Customers Relationship Management) is an example of this type of analysis. The same analysis method can be applied to determine appropriate values for the thresholds used in this invention.

In the preferred embodiment of the computer product of the present invention, a known graphical user interface 28 running on the client computer is used to populate a table of business rules 26 parameters related to product, product group and customer group relationships which parameters are stored on the server computer 12 in a manner that permits the method of the present invention to be executed by the server computer 12 in accordance with such established business rules 26, as further described below.

Processing Cycles

In the preferred embodiment of the present invention, it is preferable that processing of data in accordance with the method described herein be performed on a regular basis, for example on a weekly or monthly basis, such that the data is coterminous and complete for each cycle. As is readily understood, analysis of the data in accordance with the method of the present invention requires two complete sets of comparable data.

It is possible to apply the method of the present invention to the business performance data 17 described herein more frequently or to limited subsets of such data. To apply the method more frequently would require more frequent updates of the business performance data 17 in database 15 corresponding to the desired analysis cycle i.e. to process daily would require daily updates to the business performance data 17. resently technology to do so exists, but at significant cost and complexity.

It is also possible to apply the method of the present invention on a real time basis, using a known operational data store with real or near real time feed data feeds.

Business Logic of the Invention

The method consists of performing a series of tests and procedures throughout a selected set of business data using software code so as to provide the business logic described below, in operation of database 15 and database management system 16.

1) Account Test Operation:
   a) Calculate the difference in business volume between the values of the accounts 18 identified in (A) above at two points or periods of time for each account instance 18 (A) in relation to the plurality of accounts (A) of interest.
   b) Compare the difference calculated in 1(b) above to the business rules 26 parameters specified in (F) to determine whether or not a significant change (defined by a change exceeding the parameters) has occurred.
   c) Record a database flag 30 indicator in operation of the database management system 16, in a manner that is known, along with the unique account identifier indicating the result of the operation test in 1(c) as Yes or No.

2) Product-by-Customer Test Operation:
   a) By reference to the data relationship between accounts and customer 20 referenced customer hierarchy (B) above and the data relationship between accounts and products services 22 (C) referenced above, and the aggregate data relationship between products/services and other products/services 24, providing business volume statistics product by product and customer by customer and by product by customer for every instance.
   b) Calculating the difference in business volume between observations at two points or periods of time for each product by customer instance in the population of interest.

c) Compare the difference calculated in 2(b) above to the business rule 26 parameters specified in (F) to determine whether or not a significant change (defined by a change exceeding the parameters) has occurred.

d) Recording a database flag 30 indicator in operation of the database management system 16, in a manner that is known, along with a the unique account identifier to indicate the result of the test in 2(c) as Yes or No.

3) Product Group-by-Customer Test(s):

a) By reference to the Customer hierarchy (B) 20 and the product group hierarchy (C) 22, aggregate the account data (A) 18 business volume statistics by product group by customer by customer and by product group by customer for every instance.

b) Calculate the difference in business volume between observations at two points or periods of time for each product group by customer instance in population of interest.

c) Comparing the difference calculated in 3(b) to the business rule 26 parameters specified in (F) above to determine whether or not a significant change (defined by a change exceeding the parameters) has occurred.

d) Recording a database flag 30 indicator in operation with the database management system 16, in a manner that is known, along with the unique account identifier indicating the result of the test in 3(d) as Yes or No.

Special product groupings have been identified for use in specific industries. For example, in the Financial Services Industry, Total assets, Total liabilities, Liquid assets, Liquid liabilities, Non-liquid assets, Non-liquid liabilities have been identified as product groups that are embodied in the preferred implementation of the invention. When present these levels of customer aggregation are used to extend the iterations of calculation and flag setting in the same manner that product group is a subsequent iteration of aggregation of product. Similarly, product groupings identified for the Telecommunications industry include Long distance land plans, Mobile phone plans and Pager plans.

4) Customer and Customer Group Test(s):

a) By reference to the Customer hierarchy 20 (B), aggregating the account data 18 (A) thereby providing business volume statistics in relation to the customer population of interest.

b) Calculating the difference in business volume between observations at two points or periods of time for each customer instance in the population of interest.

c) Comparing the difference calculated in accordance with 4(b) in relation to the business rule 26 parameters specified in (F) to determine whether or not a significant change (defined by a change exceeding the parameters) has occurred.

d) Record a database flag 30 are new data points provided to database 15 in a manner that is known. As is further particularized below, these database flags 30 permit the derivation of data permitting analysis of customer, customer group, account, product, product group, liquidity preference, and asset to liability transfer behavior detection. Database flags 30 are stored in the data warehouse or data mart tables in the traditional fashion.

Household, family and corporate affiliates are examples of customer groups contemplated by the present invention. These are not customer groupings that may be available in every case. Their availability will depend on the data provided to database 15. When such customer groupings are available, in practice in accordance with the method of the present invention, the customer grouping data serves to extend the iterations of calculations referenced above as well as the indicators in the same manner s aggregation of products at higher levels of hierarchy.

Combination of the Results of the Threshold Tests

When processing of the threshold tests described above is complete, each account in the population of interest will be associated with a series of database flags 30 in database 15 in a manner that is known, thereby indicating the results of the testing performed at each level of aggregation.

It should be understood that because the analysis described herein proceeds simultaneously in three dimensions (product, customer and time), new inferences about behaviour that were previously not easily apparent become readily apparent.

The application of the business logic described above, and specifically the threshold tests described above, produces a series of threshold test results. These threshold test results are combined, in a manner that is known, to obtain a classification of data similar to that illustrated below in tabular form:

| Classification | Account/Contract | Product Group 'A' | Product Group 'B' | Customer | Customer Group |
| --- | --- | --- | --- | --- | --- |
| Intra Product transfer | Yes | No | No | No | No |
| Intra Product group transfer | Yes | Yes | No | No | No |
| Asset to liability Transfer | Yes | Yes | Yes | No | No |
| Intra profile transfer | Yes | Yes | Yes | Yes | No |
| True Defection | Yes | Yes | Yes | Yes | Yes |

In accordance with the method of the present invention, this classification of data produces business volume data (not shown). In the preferred embodiment of the present invention, this business volume data is provided in the form of a series of business volume reports 32, which are viewable by means of graphic user interface 28.

The data that is included in the data reports 32 is not otherwise generally available as easily from the source data. This data includes significant (based on business rules 26) loss (gain) of business by period of time, along with explanations of movements which do not comprise lost (gained) business but nonetheless may indicate changes in customer behaviour that are of interest for analytical purposes.

To clarify further consider these cases which, for simplicity, only consider identification of business volume defection based on the Financial Services industry. The same analytical process applies to business acquisition and the Retailing and Telecommunications industries.

Intra-Product Transfer:

Transfer between contracts e.g.—transfer of assets from Equity to Money Market mutual fund—will be identified by detection of decline in Equity with no change at the Mutual Fund product group level. This move to liquidity may prove significant on further analysis.

Intra-Product Group Transfer:

Transfer between product groups e.g. in the context of a financial services business—transfer of assets from Term Deposit to Mutual Fund—identified by reduction in Term Deposit with no change in Investments in total.

Asset to Liability Transfer:

Transfer from assets to liabilities or vice versa—e.g. in the context of a financial services business self-liquidation of a loan with proceeds of deposit redemption is indicated by decline in loan, decline in assets in combination with no significant change in the asset/loan ratio. This is an expected behaviour, significant for understanding customer lifestyle change, but may not represent defection behaviour. It is accordingly a special case.

Intra Profile Transfer:

Example—transfer of assets from one customer to another within the same household, detected by significant decline in one customer's assets offset by a corresponding increase in another customer within the same household customer group. This may indicate a change in financial affairs but it is not indicative of partial defection behaviour. In the retail sales arena, the behaviour may indicate a change in responsibility for purchases among different household members.

True Defection:

Significant declines in business volume not categorized by the above tests represent lost business to the corporation in all cases.

The data reports 32 permit business analysis for a number of purposes including for:

Identifying patterns of product defection by customers.
Identifying patterns of product acquisition by customers.
Identifying patterns of changing product use level by customers.
Identifying patterns of product substitution.
Identifying product defection tendency by customers.
Early detection of defection behaviour of individual customers and customer groups.
Evaluating success or otherwise in garnering purchases of a new or newly promoted good or service.
Input events for statistical or predictive modeling.
Portfolio management.
Compensation.
Product management.
Performance management In accordance with the above, the present invention enables discrete measurement of external flows of customer business or changes in business volume that arise from sources other than product or service substitution.

It is common practice in many industries to compensate sales people for new business brought into the company. Often these companies are unable to determine and measure the business flows that result from true acquisition as opposed to product substitution. Measuring number of accounts opened, total balances of a product, or total sales of a product, for example, does not distinguish new from existing business that has simply shifted from one product to another. A similar problem exists when looking at loss of business: account closure and portfolio balances do not accurately reveal the business loss behaviour that occurs within the portfolio of customer accounts.

Measurement of external flows can be used by the company as a method of determining commission payment to sales personnel, by associating the flows identified by the method that constitute external inflows of business to individual sales personnel. This requires that the company also have access to sales person records that are related to either customers or customer accounts in the data warehouse or data mart. Reducing erroneous payments to commissioned staff that are currently triggered by product substitutions being mistaken for sales can save substantial funds for the company applying the method.

The same measurement information enables classified reporting of changes in portfolios of business. Presently financial institutions, retailers and telecommunication companies know their net business volume change in aggregate but cannot isolate the gross effects of business gained and lost and the separate effects of product substitution which comprise the changes in the portfolio of business over time. This makes portfolio management difficult, since changes in the portfolio are of themselves not actionable.

Enabling monitoring and analysis of business performance data in accordance with selected accounts, products, customer, or groups of the foregoing, and the resultant data regarding inflows, outflows and substitutions of business, and the inferences regarding customer behaviour that can be extrapolated therefrom, permit managers to formulate business strategies targeted towards acquisition and retention of customer business. Analysis of this information may disclose to management areas of service or value proposition deficiency (evidenced by abnormally low retention of business), opportunities for re-pricing of products or services or provide the basis for allocating resources to product or services, based on improved understanding of customer usage patterns.

From a customer interaction management perspective, knowledge of customer business inflows, outflows an substitutions is fundamental to the design of marketing and customer care strategies. The invention provides electronic information about the behaviour of individual customers that can be delivered to customer care representatives, sales persons and other channels of distribution as a basis for shaping the dialogue with the customer and providing a key component of relationship management—knowledge of the customer. Knowing that a customer has recently brought new business to the company, has changed product preference or is in the process of decreasing their business is essential to demonstrating knowledge of the customer, which market research repeatedly confirms is essential to maintenance of a relationship. Technology to route this information from the database or data warehouse 15 to customer care, sales persons and other channels is commercially available from a number of vendors including Siebel Systems Inc., NCR Corporation and others.

For marketing program design and control, the data provided by this invention offers several unique benefits. For example, this data permits measurement of changes in business volume for each customer.

Marketing campaigns that identify specific customers for interaction are directly measurable by analyzing the data created by the invention for those customers.

It should be understood that the present invention also contemplates the use of known reporting tools to provide, publish or process the data reports 32. Such reporting tools include SQL, OLAP, Crystal Reports, COGNOS, and other reports specific to the needs of campaign managers can be produced by any technically proficient programmer.

For predictive modeling, the invention creates a set of new event data that are actual measures of changes in customer behaviour, as described above. This event data can be used as independent variables in predictive modeling of credit risk, defection risk, propensity to purchase and the like. Models of this nature are commercially available, but rely on record keeping system transactional information rather than analysis of customer behaviour changes identified and quantified by the invention.

Examples in Operation

One application of the invention, provided for illustration purposes only, is in financial services, such as banking, where product substitution is a frequent behaviour by customers. For example, substitution of investment products: savings accounts, term deposits, mutual funds (of various types and issuers), investment accounts, brokerage accounts makes identification of customer behaviour difficult to measure without the invention and method.

Application of the invention enables managers and relationship managers to identify key activities such as withdrawal or deposit of monies with the financial institution separately from internal transfers.

The method also enables observation of changes in liquidity preference and identification of self-liquidating behaviour such as the repayment of a loan with proceeds from an investment. The methods in the public domain and prior art do not support these important observations of behaviour.

Retail Sales Application

The invention is equally applicable in the retail industry. A store with will often carry substitute products or services that a customer may choose. Identification of product switching behaviour in purchase patterns is supported by the invention. Without application of the invention, a retail store is not otherwise able to differentiate new purchase behaviours from substitutions behaviour.

Telecommunications Application

The invention also applies to the Telecommunications industry, which offers substitute products and services to their customers. Changes in long distance plans, pagers, Internet, wireless and landline consumption can be analyzed with much greater insight when substitution behaviours are identified and understood.

Other variations and modifications of the invention are possible. For example, for identifying variations within households of purchasing behaviour, or in a business context where product substitution is commonplace e.g. the automotive replacement parts industry. All such modifications or variations are believed to be within the sphere and scope of the invention as defined by the claims appended hereto.

We claim:

1. A computer implemented method of analyzing and measuring business volume, the method including accessing a database that is linked to a computer, the computer including a database management utility to produce business volume data that includes explanations of business volume movements which do not comprise lost or gained business, the method comprising the steps of:
   (a) providing to the database business data, including data related to accounts, products, product groups, hierarchical account/product relationships, and hierarchical account/customer relationships, said business data being organized in the database, said database and database management utility supporting relational queries to said business data;
   (b) defining threshold change values regarding said business data, including threshold change values for at least two of the following: product, product group, or customer, in accordance with the organization of the business data in the database, and associating said threshold change values with the database;
   (c) performing a plurality of threshold tests for detecting changes throughout a selected set of said business data in accordance with said threshold change values within a specified period of time, said plurality of threshold tests being applied, or the application being facilitated, by one or more computers processors of the computer, and said plurality of threshold tests consisting of at least the following:
      (i) establishing one or more benchmark values of said business data;
      (ii) detecting changes to said business data to establish one or more comparison values of said business data;
      (iii) comparing said one or more benchmark values to said one or more comparison values to detect one or more changes in business volume; and
      (iv) establishing database flags in said database corresponding with said one or more changes in business volume;
   said plurality of threshold tests being applied to the business data to reflect aspects of the business data, including at least the following:
      (v) a time period, so that at least one of the plurality of threshold tests identifies changes in business data between the time period and a previous time period;
      (vi) a plurality of levels of product aggregation including one or more products and one or more product groups, so that at least one of the plurality of threshold tests identifies changes in business data relating to each of the plurality of levels of product aggregation; and
      (vii) a customer, so that at least one of the plurality of threshold tests identifies changes in business data relating to the customer;
   said plurality of threshold tests further resulting in the identification of the business data as reflecting one or more changes, said one or more changes each being classified with respect to at least a change direction and a change magnitude, and said plurality of threshold tests producing results simultaneously that are applied to at least three dimensions of the business data so that results of the threshold tests are identifiable as relating to at least the following: the plurality of levels of product aggregation, the customer, and the time period; and
   (d) combining the results of the threshold tests to obtain a classification of the business volume data indicating measurements of changes in business volume, including measurements of external flows of business.

2. The method claimed in claim 1, whereby said business volume data includes data relating to data flows into, out of, and among account, product or customer classifications, within a business.

3. The method claimed in claim 2, whereby said business volume data provides customer behaviour data.

4. The method claimed in claim 3, whereby said business data further includes product-product group hierarchical relationships.

5. The method as claimed in claim 3, whereby producing the business volume data enables analysis of said business volume so as to permit:
   (a) identification of business flows associated with individual clients from one account to another;
   (b) identification of business flows associated with individual clients from one product to another; and
   (c) identification of business flows associated with individual clients within a business entity, among subsidiaries and divisions of the business entity and/or out of the business entity.

6. The method as claimed in claim 5, whereby the claimed analysis of the business volume data enables the creation of account level reports regarding:
   (a) movements of business between alternative accounts at a client level;
   (b) movements of business between products at a product level;
   (c) movements of business among business segments at a customer segment level;

(d) movements of business between business units at a business unit level; and (e) movements of business between geographic areas at a geographic area level.

7. The method as claimed in claim 6, whereby said account level reports enable measurement and analysis of a business entity's:

(a) total business volumes including increments, decrements and substitutions at the account level;

(b) sales performance of sales personnel, including the ability to segregate client product substitution behaviours from loss of business;

(c) business performance ascribed to particular geographic areas identifying business flows across such boundaries and separating from business flows lost or gained to the business entity; and (d) effectiveness of specific marketing campaigns aimed at increasing or retaining the business of the business entity.

8. The method of claim 1, comprising the further step of defining one or more threshold change values and assigning said threshold change values to said threshold tests.

9. The method of claim 8, comprising the further step of engaging said database management utility to retrieve threshold change value data from said database in relation to one or more selected threshold change values.

10. The method of claim 9, whereby a reporting facility is linked to said database and said database management facility, comprising the further step of generating a business volume change report by engaging the reporting facility to organize said selected threshold change values into a report.

11. The method as claimed in claim 1, comprising the further steps of:

(a) applying the change direction as one of the following: a positive change, or a negative change;

(b) applying the change magnitude as at least one of the following: a value, or a quantity; and (c) utilizing the business volume data to facilitate measurements including measurements of external flows of business, such measurements being one or more of the following: transfers of assets to liabilities; transfer of assets from an equity product to a mutual fund product; or transfer of assets between product groups; and (d) utilizing the business volume data to facilitate analysis based on the measurements, such analysis including one or more of the following: identifying patterns of product defection by customers; identifying patterns of product acquisition by customers; identifying input events for statistical or predictive modeling; and evaluating success in garnering purchases of a new product/service.

12. The method as claimed in claim 1, comprising the further step of: analyzing the business volume data to ascertain changes in customer behaviour, said changes in customer behaviour being indicated by the changes in business data reflected in the business volume data to be related one or more of the following: the time period; the one or more products; the one or more product groups; and the customer.

13. The method as claimed in claim 1, comprising the further step of: applying one of the plurality of threshold tests to the business data to process a product-by-customer test operation, said product-by-customer test operation comprising the following steps:

(a) providing a set of business volume statistics based on product-by-product and customer-by-customer that references relationships in the business data between:

(i) data sets including: accounts and a customer referenced customer hierarchy; and accounts and product/services; and (ii) aggregate data sets including: business data relating to a first product/service and other products/services;

(b) calculating the difference in business volume between business data for a first time period and business data for a second time period for each product-by-customer instance;

(c) comparing the calculated difference in business volume to applicable threshold change values to indicate any change that exceeds the applicable threshold change values; and (d) utilizing the database management utility to record a database flag indicator and a unique account identifier to indicate the result of the product-by-customer test operation as: a Yes flag when the change exceeds the applicable threshold change values; a No flag when the change does not exceed the applicable threshold change values.

14. A system for analyzing and measuring business volume comprising:

(a) a computer;

(b) a database linked to the computer, said database being operable to store and access business data, said business data including data related to accounts, products, product groups, hierarchical account/product relationships, and hierarchical account/customer relationships; and (c) a software application loaded on the computer, said software application including a database management utility linked to the database, and said database and database management utility being operable to support relational data queries that utilize the business data for the purpose of the query, and said database utility further being linked to a business volume data analysis facility operable to enable a user to define at least one threshold change value relating to at least two of the following: product, product group, or customer, said business volume data analysis facility being further operable to:

(i) perform a plurality of threshold tests utilizing the at least one threshold change value for detecting changes throughout a selected set of said business data in accordance with said threshold change values within a specified period of time, said plurality of threshold tests consisting of at least the following:

(A) establishing one or more benchmark values of said business data;

(B) detecting changes to said business data to establish one or more comparison values of said business data;

(C) comparing said one or more benchmark values to said one or more comparison values to detect one or more changes in business volume; and (D) establishing database flags in said database corresponding with said one or more changes in business volume; and (ii) apply the plurality of threshold tests to the business data to reflect aspects of the business data, including at least the following:

(E) a time period, so that at least one of the plurality of threshold tests identifies changes in business data between the time period and a previous time period;

(F) a plurality of levels of product aggregation including one or more products and one or more product groups, so that at least one of the plurality of threshold tests identifies changes in business data relating to each of the plurality of levels of product aggregation; and (G) a customer, so that at least one of the plurality of threshold tests identifies changes in business data relating to the customer;

(iii) utilize the threshold tests to result in the identification of the business data as reflecting one or more changes, said one or more changes each being classified with respect to at least a change direction and a change magnitude, and said plurality of threshold tests producing results simultaneously that reflect at least three dimensions of the business data so that results of the threshold tests are identifiable as relating to at least the following: the plurality of levels of product aggregation, the customer, and the time period; and (iv) combine the results of said threshold tests to obtain a classification of the business volume data that includes explanations of business volume movements which do not comprise lost or gained business and indicates measurements of changes in business volume, including measurements of external flows of business.

15. A system as claimed in claim 14, wherein the business volume data analysis facility and the database management utility enable the computer to retrieve threshold change value data from said database in relation to one or more selected threshold change values.

16. A system as claimed in claim 15, wherein the software application further includes a reporting facility linked to said database, database management facility and business volume data analysis facility, said reporting facility enabling the generation of a business volume change report based on said selected threshold change values.

17. A computer program product comprising a non-transitory computer readable medium bearing software instructions, said software instructions being operable to enable one or more computers to perform predetermined operations, said one or more computers being linked to a database, said computer product comprising:

(a) a database management utility operable to support relational data queries of the database, said database containing business data, including data related to accounts, products, product groups, hierarchical account/product relationships, and hierarchical account/customer relationships; and (b) a business volume data analysis facility linked to said database management utility, said business volume data analysis facility being operable to enable a user to define threshold change values regarding said business data, including threshold change values for at least two of the following: product, product group, or customer, in accordance with the business data in the database, and to associate said threshold change values with the database, said business volume data analysis facility being further operable to:

(i) perform a plurality of threshold tests utilizing at least one threshold change value for detecting changes throughout a selected set of said business data in accordance with said threshold change values within a specified period of time, said plurality of threshold tests consisting of at least the following:

(A) establishing one or more benchmark values of said business data;

(B) detecting changes to said business data to establish one or more comparison values of said business data;

(C) comparing said one or more benchmark values to said one or more comparison values to detect one or more changes in business volume; and (D) establishing database flags in said database corresponding with said one or more changes in business volume; and (ii) apply said plurality of threshold tests to the business data to reflect aspects of the business data, including at least the following:

(E) a time period, so that at least one of the plurality of threshold tests identifies changes in business data between the time period and a previous time period;

(F) a plurality of levels of product aggregation including one or more products and one or more product groups, so that at least one of the plurality of threshold tests identifies changes in business data relating to each of the plurality of levels of product aggregation; and (G) a customer, so that at least one of the plurality of threshold tests identifies changes in business data relating to the customer;

(iii) utilize the threshold tests to result in the identification of the business data as reflecting one or more changes, said one or more changes each being classified with respect to at least a change direction and a change magnitude, and said plurality of threshold tests producing results simultaneously that reflect at least three dimensions of the business data so that results of the threshold tests are identifiable as relating to at least the following: the plurality of levels of product aggregation, the customer, and the time period; and (iv) combine the results of said threshold tests to obtain a classification of the business volume data that includes explanations of business volume movements which do not comprise lost or gained business and indicates measurements of changes in business volume, including measurements of external flows of business.

18. The computer product claimed in claim 17, wherein the business volume data analysis facility and the database management utility enable the computer to retrieve threshold change value data from said database in relation to one or more selected threshold change values.

19. The computer product claimed in claim 18, further comprising a reporting facility linked to said database, database management facility and business volume data analysis facility, said reporting facility enabling the generation of a business volume change report based on said selected threshold change values.

20. A non-transitory computer readable medium executable by a computer system linked to a database and a database management utility for facilitating analyzing and measuring business volume, said computer readable medium comprising computer-executable instructions that, when executed, cause the computer system to perform the steps of:

(i) providing to the database business data, including data related to accounts, products, product groups, hierarchical account/product relationships, and hierarchical account/customer relationships, said business data being organized in the database, said database and database management utility supporting relational queries to said business data;

(ii) defining threshold change values regarding said business data, including threshold change values for at least two of the following: product, product group, or customer, in accordance with the organization of the business data in the database, and associating said threshold change values with the database;

(iii) performing a plurality of threshold tests for detecting changes throughout a selected set of said business data in accordance with said threshold change values within a specified period of time, said plurality of threshold tests consisting of at least the following:

(A) establishing one or more benchmark values of said business data;

(B) detecting changes to said business data to establish one or more comparison values of said business data;

(C) comparing said one or more benchmark values to said one or more comparison values to detect one or more changes in business volume; and (D) establishing database flags in said database corresponding with said one or more changes in business volume; and said plurality of threshold tests being applied to the business data to reflect aspects of the business data, including at least the following:

(E) a time period, so that at least one of the plurality of threshold tests identifies changes in business data between the time period and a previous time period;

(F) a plurality of levels of product aggregation including one or more products and one or more product groups, so that at least one of the plurality of threshold tests identifies changes in business data relating to each of the plurality of levels of product aggregation; and (G) a customer, so that at least one of the plurality of threshold tests identifies changes in business data relating to the customer;

said plurality of threshold tests resulting in the identification of the business data as reflecting one or more changes, said one or more changes each being classified with respect to at least a change direction and a change magnitude, and said plurality of threshold tests producing results simultaneously that are applied to at least three dimensions of the business data so that results of the threshold tests are identifiable as relating to at least the following: the plurality of levels of product aggregation, the customer, and the time period; and (d) combining the results of the threshold tests to obtain a classification of the business volume data that includes explanations of business volume movements which do not comprise lost or gained business, and indicates measurements of changes in business volume, including measurements of external flows of business.

* * * * *